March 17, 1959  E. H. GIBBS  2,877,819
PUNCTURE SEALING PNEUMATIC TIRE
Filed March 3, 1953  3 Sheets-Sheet 1
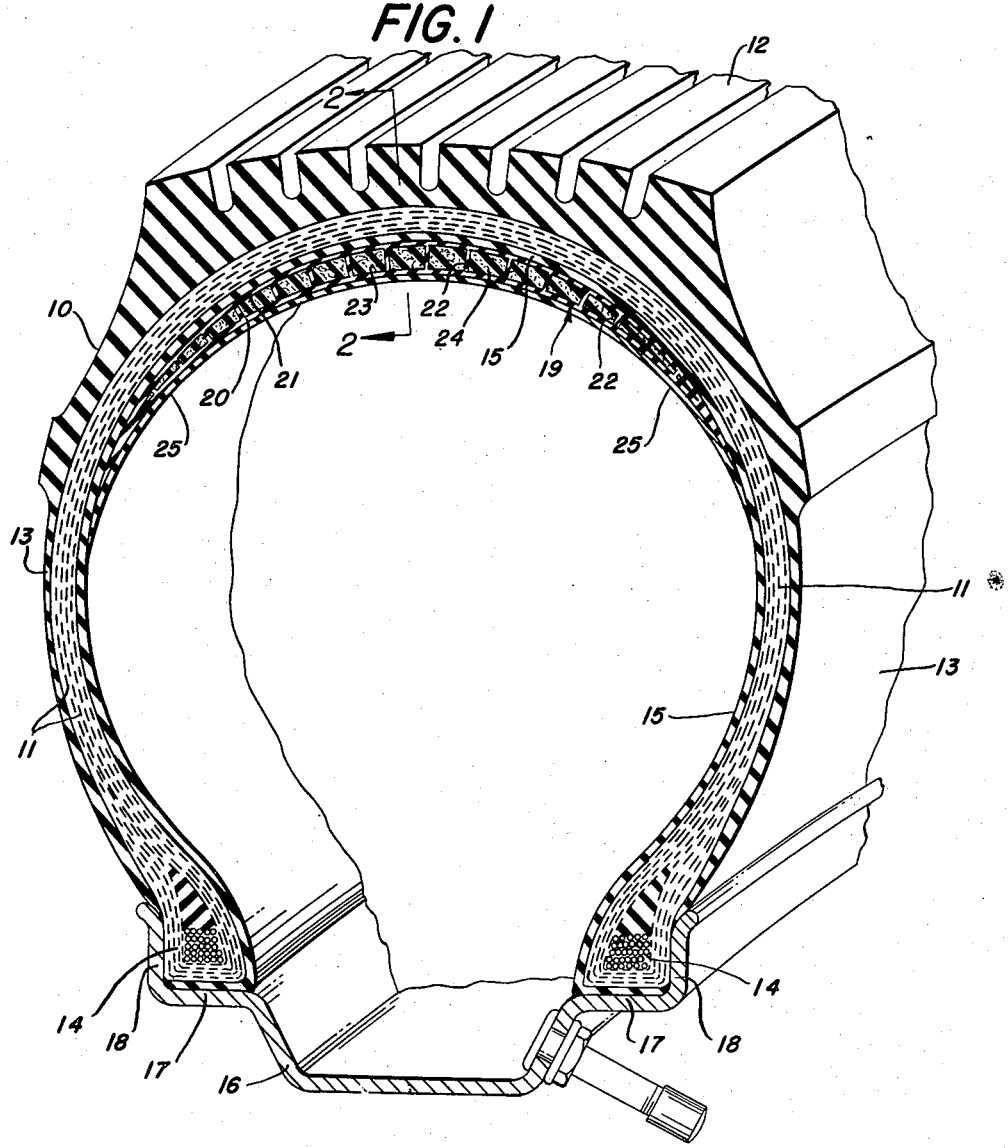
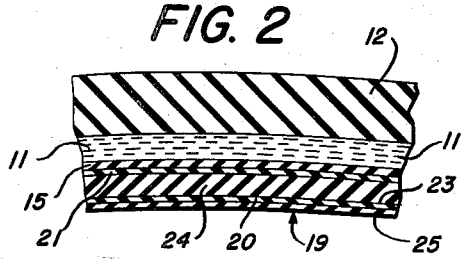
INVENTOR.
EVERETT H. GIBBS
BY
William Cleland
ATTORNEY March 17, 1959  E. H. GIBBS  2,877,819
PUNCTURE SEALING PNEUMATIC TIRE
Filed March 3, 1953  3 Sheets-Sheet 2

INVENTOR.
EVERETT H. GIBBS
BY
William Cleland
ATTORNEYS

March 17, 1959  E. H. GIBBS  2,877,819
PUNCTURE SEALING PNEUMATIC TIRE
Filed March 3, 1953  3 Sheets-Sheet 3

INVENTOR.
EVERETT H. GIBBS
BY
William Cleland
ATTORNEY

United States Patent Office 2,877,819
Patented Mar. 17, 1959

2,877,819

PUNCTURE SEALING PNEUMATIC TIRE

Everett H. Gibbs, Wadsworth, Ohio, assignor to Seiberling Rubber Company, Barberton, Ohio, a corporation of Delaware Application March 3, 1953, Serial No. 340,031

7 Claims. (Cl. 152—347)

This invention relates to pneumatic tires, and particularly to tires designed to be mounted on vehicle wheel rims to contain inflation air without the use of an inner tube.

Heretofore, tubeless tires have been provided with a puncture-sealing rubber or like plastic material on the inner peripheries of the crown portions of the same, adapted to self-seal punctures made by sharp objects, such as nails or pieces of metal. Known tire structures of this type, however, have been objectionable for the reason that the self-sealing plastic material is by its nature relatively soft, particularly when the tire becomes heated under various conditions of use, and has a tendency eventually to bunch up around the transverse central portion of the tire crown completely around the periphery thereof due to centrifugal force applied when the tire is rotated at high speeds, thereby leaving the outer portions of the crown unprotected by puncture-sealing material. Similarly, circumferential flow of the plastic material results in an unbalanced condition in the tire.

One object of the present invention is to provide a tubeless tire having puncture-sealing means, particularly on the inner periphery of the tire adjacent the tread portion of the same, which will not be disturbed, misplaced or otherwise adversely affected by heat caused by friction in the tire or by centrifugal force while the tire is in service.

Another object of the invention is to provide a tubeless tire having puncture-sealing means forming a substantially integral part of the tire casing, and hence not subject to separation from the casing upon being punctured as by a sharp object.

Another object of the invention is to provide a tubeless tire of the character described in which the self-sealing portion of the tire casing has substantially permanent shape and is sufficiently self-supporting on the casing that said portion may be any desired thickness within certain limitations relating to tire design.

Other objects of the invention will be manifest from the following brief description and the accompanying drawings.

Of the accompanying drawings:

Figure 1 is a fragmentary perspective view showing a cross-section of a tubeless pneumatic tire embodying the features of the invention.

Figure 2 is a fragmentary cross-section, taken substantially on the line 2—2 of Figure 1.

Figure 3:
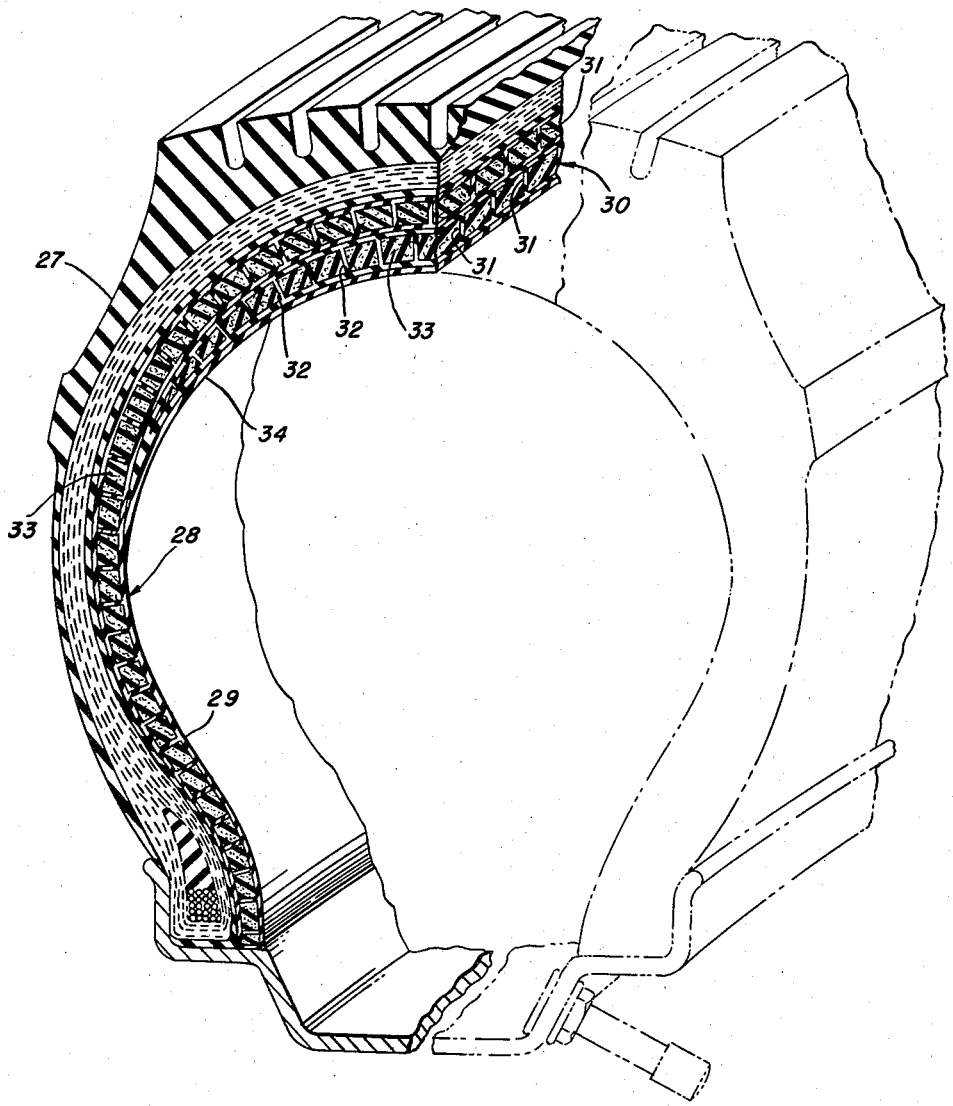
Figure 3 is a view similar to Figure 1 of a modified form of tubeless tire, but partly broken away along the circumferential centerline of the tire.

Referring to Figure 1 of the drawings, there is illustrated a pneumatic tire comprising an annular casing 10 having the usual reinforcing layers 11, which are predominantly of rubberized cord fabric, an outer tread portion 12 of the usual tread rubber, and sidewalls 13, 13 extending radially inwardly therefrom and terminating in spaced apart bead portions 14, 14. Next to the innermost ply of rubberized fabric 11 may be a relatively thin layer 15 of natural or synthetic rubber which is particularly impervious to passage of air under tire inflation pressures and yet which is capable of integrally bonding to the rubberized fabric by heat of vulcanization. The layer 15 extends from bead to bead, including the inner peripheries of the beads, whereby inflation air is completely sealed within the tire when the same is mounted on a rim 16, the inflation pressure being effective to force the bead portions 14 into tight sealing relation with opposite seat portions 17 and side flanges 18 of the rim.

Integrally bonded to the inner crown portion of the tire casing 10, as by heat of vulcanization, may be a cellular body 19 of substantial thickness at the peripheral center of the tire and tapering at opposite sides into the sidewalls of the casing. The body 19 may be composed of thin inner and outer peripheral walls 20 and 21 connected by laterally spaced, peripherally extending, thin connecting partitions 22, 22 defining annular cells 23, 23 containing a suitable puncture-sealing compound 24. This compound may be any of the various compounds of natural or synthetic rubber which after vulcanization of the tire remain soft and adhesively plastic. The material of the body 19, including the walls 20 and 21 and the partitions 22, is relatively tough and durable, that is, to be self-closing at a point of puncture to the extent that the material 24 is retained within the cells 23 after the puncturing objects are withdrawn. Material for this purpose may be natural or synthetic rubber which is highly elastic and capable of being integrally bonded to the air-sealing layer 15. Further protection against leakage of air through punctured portions of body 19 may be accomplished by provision of a relatively thin layer 25 of plastic material similar to the puncture-sealing material 24 on the inner wall 20 of said body.

In use of the improved tire mounted on a rim 16, as shown in Figure 1, air under pressure is retained within the tire by the sealing relation of the tire bead portions 14 against the rim seats 17 and flanges 18 to maintain the tire in desired inflated condition. Upon entry of a sharp object, such as a nail or a piece of metal, through the crown portion of the tire and through the cellular body 19, the material 24 will adhere tenaciously to the object to prevent escape of the inflation air. Upon withdrawal of the puncturing object from the tire the material 24 immediately flows together to seal the opening made by the object. Because the web portions 22 are uniformly relatively thin (see Figure 1), the cellular body between the inner and outer walls 20 and 21, respectively, is predominantly puncture sealing material 24, whereby a puncturing object upon penetrating the tread portion 12 of the tire casing, and the puncture sealing body 19, at substantially any point, must pass through sufficient puncture sealing material to seal the opening made by the object as described above.

Figure 3 shows a tire casing 17 which is in all respects like tire 10 of Figure 1, except that puncture-sealing body 28 extends from bead to bead of the tire and is relatively thicker at the crown than at the sidewall portions thereof. To this end the body 28 may comprise an outer cellular layer 29 vulcanized to the inner peripheral portions of the tire casing, as before, but extending from bead to bead of the tire, and an inner cellular layer 30 bonded to the outer layer 29 by heat of vulcanization in superposed relation to the most vulnerable crown area of the tire. If desired the layers 29 and 30 may have circumferentially spaced partitions 31, 31 between laterally spaced, circumferential partitions 32, 32 defining relatively small cells for containing puncture sealing plastic material 33. As before thin layer 34 of puncture sealing material may be provided on the inner surface of body 28 at least in the crown region of the tire.

Thus, it will be readily seen that the puncture-sealing body 28 may be of substantial thickness and yet because the plastic material 33 is confined in the cells it cannot be displaced by centrifugal force or other conditions which would result in areas of the tire being unprotected against air-releasing puncture by sharp objects. The improved cellular construction also permits wider latitude in compounding the sealant 33 than has heretofore been possible.

Figure 4:
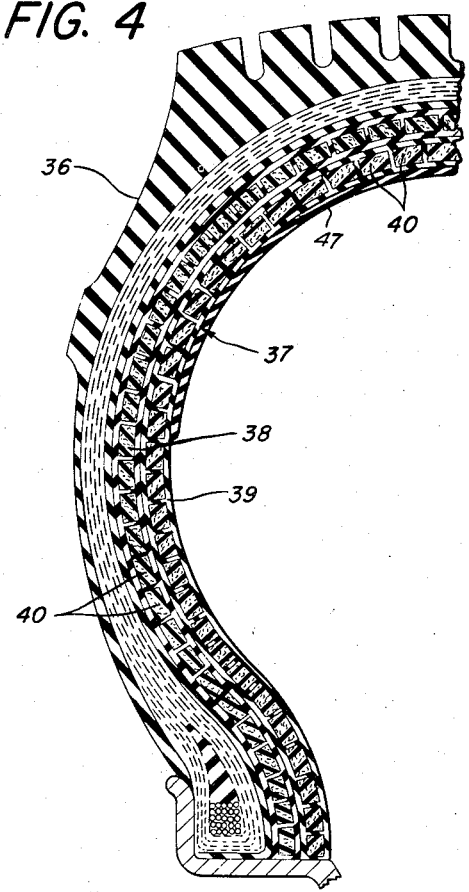
Figure 4 is a fragmentary transverse cross-section through another modified form of tubeless tire.

Referring to Figure 4, there is illustrated a tubeless tire 36 which is in all respects like the tires shown in Figures 1 and 3, except that the puncture-sealing means 37 includes two superposed cellular layers 38 and 39 constructed as before, but of substantially uniform thickness extending from bead-to-bead of the tire casing. The transversely spaced cells 40, 40 of the layers may extend continuously around the circumference of the tire, as shown in Figure 2, or they may be divided into smaller cells as shown in longitudinal section in Figure 3. This type of tire is particularly adaptable for use on army and other vehicles or aircraft, where bullet-proofing is desirable from bead-to-bead.

Figure 5:
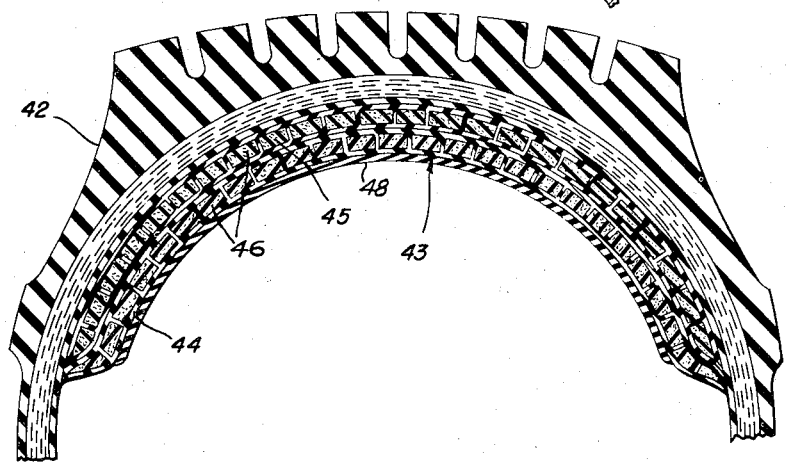
Figure 5 is a fragmentary transverse cross-section through the crown portion of still another modified form of tubeless tire.

Figure 5 shows still another modified form of tubeless tire 42, wherein puncture sealing means 43 comprises two superposed cellular layers 44 and 45 of substantially uniform thickness overlying the crown area of the tire. The extent of the cells 46, 46 in circumferential direction may be varied, as suggested above.

In both forms of the invention shown Figures 4 and 5 thin layers 47 and 48 of puncture-sealing material may be applied to the inner surface portions of the puncture-sealing means 37 and 43, respectively, in the manner described in connection with Figures 1, 2 and 3, if necessary or desirable.

Other modifications of the invention may be resorted to without departing from the spirit thereof or the scope of the appended claims.

What is claimed is:

1. A unitary tubeless pneumatic tire, comprising a hollow casing of fabric reinforced vulcanized, rubber-like elastic material and including a circumferential tread portion of substantial width and opposite sidewalls extending radially inwardly therefrom, and an annular puncture-sealing body of substantial width on the inner periphery of said casing in predeterminately laterally centered relation with respect to said tread portion and sidewalls, said body including radially inner and outer walls of rubber-like material integrally connected at laterally spaced peripheral side portions of the body and said outer wall being integrally cured to the elastic material of said fabric reinforced casing, said body having web portions integrally connecting between said inner and outer walls thereof defining a plurality of separate cells completely around the body, and said cells containing puncture-sealing material, said web portions being uniformly relatively thin, whereby said cellular body between said inner and outer walls thereof is predominantly puncture sealing material so that a puncturing object penetrating the tread portion of said casing and said body at substantially any point must pass through sufficient said puncture sealing material to seal against escape of inflation air through the puncture made by the puncturing object.

2. A unitary tubeless tire as set forth in claim 1, wherein said cells are uniformly disposed in the body laterally and circumferentially thereof.

3. A unitary tubeless pneumatic tire as set forth in claim 1, said body including a plurality of layers containing said separate cells of puncture-sealing material.

4. A unitary tubeless pneumatic tire, as set forth in claim 1, said body including a plurality of superposed layers containing said separate cells of puncture-sealing material, the cells of adjacent said superposed layers being in generally overlapping relation with respect to each other.

5. A unitary tubeless pneumatic tire, as set forth in claim 1, said body including a plurality of layers containing said separate cells of puncture-sealing material, at least one of said plurality of layers overlying a substantial proportion of said opposite sidewalls.

6. A unitary tubeless pneumatic tire, as set forth in claim 1, said body including a plurality of layers containing said separate cells of puncture-sealing material, at least one of said plurality of layers extending over said sidewalls substantially to said annular bead portions.

7. A unitary tubeless pneumatic tire, comprising a hollow casing of fabric reinforced vulcanized, rubber-like elastic material and including a circumferential tread portion of substantial width and opposite sidewalls extending radially inwardly therefrom, and an annular puncture-sealing body of substantial width on the inner periphery of said casing in predeterminately laterally centered relation with respect to said tread portion and sidewalls, said body including radially inner and outer walls of rubber-like material integrally connected at laterally spaced peripheral side portions of the body and said outer wall being integrally cured to the elastic material of said fabric reinforced casing, said body having circumferentially extending web portions integrally connecting between said inner and outer walls thereof and defining a plurality of separate annular cells around the body, said cells containing puncture-sealing material, said web portions being uniformly relatively thin, whereby said cellular body between said inner and outer walls thereof is predominantly puncture sealing material so that a puncturing object penetrating the tread portion of said casing and said body at substantially any point must pass through sufficient said puncture sealing material to seal against escape of inflation air through the puncture made by the puncturing object.

References Cited in the file of this patent
UNITED STATES PATENTS

| | | |
|---|---|---|
| 1,977,281 | Knowlton | Oct. 16, 1934 |
| 2,345,200 | Iknayan | Mar. 28, 1944 |
| 2,489,995 | Young | Nov. 29, 1949 |
| 2,566,384 | Tilton | Sept. 4, 1951 |
| 2,712,847 | Harris | July 12, 1955 |